United States Patent
Uhler

(10) Patent No.: US 9,020,657 B2
(45) Date of Patent: Apr. 28, 2015

(54) METHOD FOR AUTOMATED VIN ACQUISITION AND CLOSE PROXIMITY VIN VERIFICATION

(75) Inventor: Joseph David Uhler, Elkton, MD (US)

(73) Assignee: Joseph D. Uhler, Elkton, MD (US)

( * ) Notice: Subject to any disclaimer, the term of this patent is extended or adjusted under 35 U.S.C. 154(b) by 547 days.

(21) Appl. No.: 13/506,660

(22) Filed: May 8, 2012

(65) Prior Publication Data

US 2012/0294238 A1 Nov. 22, 2012

Related U.S. Application Data

(60) Provisional application No. 61/518,606, filed on May 9, 2011.

(51) Int. Cl.
| | |
|---|---|
| *G08G 1/017* | (2006.01) |
| *H04W 4/00* | (2009.01) |
| *H04W 4/02* | (2009.01) |
| *H04W 4/04* | (2009.01) |
| *H04W 84/18* | (2009.01) |

(52) U.S. Cl.
CPC ............... *H04W 4/021* (2013.01); *G08G 1/017* (2013.01); *H04W 4/046* (2013.01); *H04W 84/18* (2013.01)

(58) Field of Classification Search
USPC .......................................................... 701/1
See application file for complete search history.

(56) References Cited

U.S. PATENT DOCUMENTS

| | | | |
|---|---|---|---|
| 4,908,629 A | 3/1990 | Apsell et al. | |
| 5,488,360 A | 1/1996 | Ray | |
| 5,630,209 A * | 5/1997 | Wizgall et al. | ................ 455/521 |
| 6,052,065 A | 4/2000 | Glover | |
| 7,024,308 B2 | 4/2006 | Oesterling et al. | |
| RE41,395 E * | 6/2010 | Jambhekar et al. | .......... 701/29.6 |
| 2002/0057764 A1* | 5/2002 | Salvucci et al. | ................ 379/37 |
| 2002/0103577 A1* | 8/2002 | Newport | ........................... 701/1 |
| 2003/0154009 A1* | 8/2003 | Basir et al. | ...................... 701/35 |
| 2005/0088320 A1* | 4/2005 | Kovach | .......................... 340/933 |
| 2006/0114531 A1* | 6/2006 | Webb et al. | ...................... 359/15 |
| 2007/0287430 A1* | 12/2007 | Hosain et al. | ............. 455/414.1 |
| 2008/0071882 A1* | 3/2008 | Hering et al. | ................ 709/217 |
| 2009/0075703 A1* | 3/2009 | Furbeck | .................... 455/569.2 |
| 2009/0299857 A1* | 12/2009 | Brubaker | ................... 705/14.66 |
| 2012/0215594 A1* | 8/2012 | Gravelle | ......................... 705/13 |

OTHER PUBLICATIONS

Deren Glenn, Popular Mechanics Magazine "The State of Vehicle-to-Vehicle-Communications" Mar. 21, 2007.
Media Ford.com, Article, Ford Motor Company "Ford Demonstrates the Future Car to Car Communication" May 26, 2011.
Valdes-Dapena, Peter, CNN Money Magazine "Consumer Reports Supports Cars for the Future" Feb. 12, 2012.

* cited by examiner

*Primary Examiner* — Shelley Chen

(57) ABSTRACT

A new method for transmitting and receiving automated Vehicle Identification Numbers (VIN) and used for the verification of Vehicle Identification Numbers within close proximity of one or more vehicles simultaneously. Provides a new method for real time, on scene vehicle to vehicle information which are located within close proximity to each other for the purpose of transmitting and receiving Vehicle Identification Numbers, vehicle license plate information and owner information during vehicle to vehicle crashes, vehicle to pedestrian crashes, locating stolen vehicles, missing vehicles, crashed vehicles and stranded vehicles. The new inventive method comprises of Wireless Fidelity (WiFi) equipped vehicles for transmitting the vehicles 17 digit VIN and comprises of Computer Modem equipped vehicles or persons for receiving the vehicles 17 digit VIN.

3 Claims, 1 Drawing Sheet

METHOD FOR AUTOMATED VIN ACQUISITION AND CLOSE PROXIMITY VIN VERIFICATION

CROSS-REFERENCE TO RELATED APPLICATIONS

Figure 4:
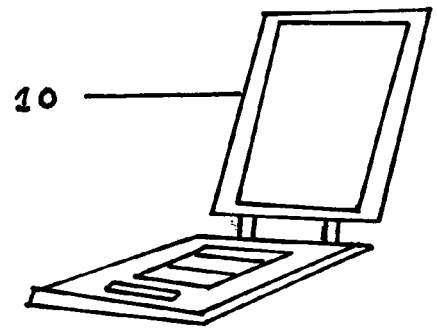

This application claims the benefit of PPA Ser. No. 61/518,606, filed 2011 May 9 by the present inventor, which is incorporated by reference.

FEDERALLY SPONSORED RESEARCH

None.

SENTENCE LISTING

None.

BACKGROUND

Prior Art

The following is a tabulation of some prior art that presently appears relevant:

U.S. Patents

| Patent Number | Issue Date | Patentee |
| --- | --- | --- |
| 0,071,882 | Mar. 20, 2008 | Hering/Ampunan |
| 7,024,308 | Dec. 19, 2993 | Osterling/Sumcad/Stephan/Rennells |
| 6,052,065 | Apr. 14, 2000 | Glover |
| 5,488,360 | Jan. 30, 1996 | Ray |
| 4,908,629 | Mar. 13, 1990 | Apsell/Stapelfeld |

Nonpatent Literature Documents

Derene, Glenn, Popular Mechanics Magazine, "The State of Vehicle-to-Vehicle Communications" (Mar. 21, 2007)
Media.Ford.Com, Article, Ford Motor Company, "Ford Demonstrates the Future of Car-to-Car Communication" (May 26, 2011)
Valdes-Dapena, Peter, CNN Money Magazine, "Consumer Reports Supports Cars for the Future" (Feb. 12, 2012)

The prior art, although crowded, has provided systems and methods claiming to provide method's, apparatus' and device's for which vehicle identification numbers are transmitted and received. The following are some prior art that presently appears relevant. A detailed description of the prior art is given explaining the differences which allows those skilled in the art to realize the clear distinction between The New Method for Automated VIN Acquisition and Close Proximity VIN Verification and the described prior art. The following description of the prior art clearly describes the distinction and differences by eliminating dispatch services, repeaters and call centers as described in the following prior art. The prior art discusses the use of vehicle to dispatch, vehicle to call center and vehicle to repeater to call center systems and methods.

This method as described under PPA Ser. No. 61/518,606 and filed May 9, 2011 eliminates the call center, dispatch service and repeater, therefore streamlining the process into a real time, on scene vehicle to vehicle, vehicle to person and person to vehicle communication which could reduce or eliminate vehicle to vehicle and vehicle to person "hit and run" investigations.

The Method for Obtaining (VIN) Vehicle Identification Numbers Electronically as disclosed by U.S. Pat. No. 0,071,882 to Herring and Ampunan describes a method in which the VIN request is generated at the vehicle through the vehicle user interface described as a visual display, microphone, speaker, keypad, electronic control or button which creates a remote call center.

The Telematic Method for Real-time Routing to Stolen Vehicles as disclosed by U.S. Pat. No. 7,024,308 to Oesterling, Sumcad, Stefan and Rennells describes a method which involves a telematic system where the telematic unit is incorporated within a stolen vehicle. The system involves the use of a call center and a second telematic unit incorporated within a police vehicle. This method involves the pushing of GPS coordinates between the stolen vehicle the call center and the police unit.

VIN Reading and Transmitting Systems for Automatically Detecting a Vehicle Identification Number such as disclosed by U.S. Pat. No. 6,052,065 to Glover provides a device for automatically detecting a vehicle identification number and transmitting the number to a dispatch station for immediate identification of the vehicle and owner.

Vehicle Detection and Identification System as disclosed in U.S. Pat. No. 5,488,360 to Ray involves the method of detecting and identifying vehicles with cellular telephone equipment and transmitting an identification number from a cellular telephone. Ray describes a method used primarily for automated toll paying and restricted access areas with the use of a cellular telephone within the vehicle.

An Apparatus for Locating and Tracking Stolen or Missing Vehicles and the like in U.S. Pat. No. 4,908,629 to Apsell and Stapelfeld provides a transponder vehicle tracking apparatus having, in combination direction finding means for receiving activated vehicle transponder periodic radio reply signals which carry vehicle identification code information and for alphanumerically displaying the same.

The apparatus described by Apsell and Stapelfeld discloses nothing in it's claims or embodiment which would describe acquiring a VIN or any additional vehicle information without first having the vehicle owner advise and notify a call center or dispatch service that the vehicle was stolen. The apparatus described by Apsell and Stapelfeld becomes operational only after the call center is notified through the use of a repeater and that the vehicle must already be reported stolen which basically renders it ineffective and limiting without using a repeater, call center or dispatch service.

The apparatus described by Apsell and Stapelfeld discloses the locking onto and then displaying radio reply signals of only one selected vehicle and whereas the use is primarily for tracking only one particular vehicle for which the vehicle owner must have already reported the vehicle as stolen to police. Nothing in its embodiment describes or discloses the apparatus as being used for a continuous and simultaneous Method for Automated VIN Acquisition and Close Proximity VIN Verification wherein the vehicle(s) VIN, year, make, model, color, license plate number and owner information is acquired in real time and while at the scene of a vehicle theft, vehicle to vehicle crashes, single vehicle crashes, multiple vehicle crashes, carjacking and single to multiple vehicle traffic stops.

The aforementioned methods, apparatus' and systems described however does not provide a means for the purpose of automatically acquiring (VIN) numbers while in close proximity of a stolen, stranded or crashed vehicle(s). The aforementioned prior art in no way describes or provides for the immediate and continuous on-scene VIN acquisition. Nor does the prior art describe, disclose or provide for the use of an acquired Vehicle Identification Number of the vehicle(s) VIN in order to determine and verify the vehicle or vehicle's owners information, without using a "call center" as described in Hering and Amunan, a "call center" as described by Oesterling, Sumcad, Stefan and Rennells., a "dispatch office" as described by Glover, a "Toll Plaza" as described by Ray a "selected vehicle command activated signal" tracking apparatus as described by Aspell and Stapelfeld.

None of the aforementioned prior art describes or discloses real-time, on-scene and Continuous automated VIN acquisition of vehicles to immediately assist law enforcement officers in the field and others in the detection and recovery of stolen, missing, stranded or crashed motor vehicles.

Some of the latest FBI statistics indicate that motor vehicle thefts in the United States has sustained a loss to consumers of approximately 4 billion dollars per year. Studies have indicated that auto theft in America has continued to have a negative impact on both the automobile insurance industry and consumers. Both continue to battle the rising costs of automobile insurance, repair and vehicle replacement.

This invention relates to a new method using automated VIN acquisition and VIN verification of one or more vehicle identification numbers (VIN) to include license plates, vehicle make, model, color and owner information. The automated VIN information is then used for the purpose of detecting vehicle to vehicle crashes, stolen vehicle identification, single vehicle crashes and detecting stranded motorists. This inventive method is used to immediately determine whether or not the vehicle information corresponds with the on scene visual inspection of the vehicle VIN by law enforcement in the field. The on scene acquired VIN is also checked through Miles/NCIC, NICB as well as additional data bases used for determining the ownership of a vehicle and whether or not the vehicle is listed as stolen.

The New Method for Automated VIN Acquisition and Close Proximity VIN Verification includes the use of a mobile WiFi (wireless fidelity) modem/router which is pre-programmed with a 17 digit VIN, vehicle information etc. The mobile WiFi modem/router is powered primarily by conventional wiring which is connected directly into the vehicles 12 volt electrical system of any type vehicle, recreation vehicle or construction equipment. The mobile WiFi modem/router also has the capability of maintaining its own battery power as the backup should the vehicles main power become severed.

An automobile or equipment VIN (Vehicle Identification Number) is commonly known to the automotive industry and is described as the 17 digit alphanumeric designated data plate. The VIN number of a vehicle is assigned to every vehicle from the manufacturer and is unique to each vehicle. Prior to the installation and programming of the mobile WiFi modem/router, the 17 digit VIN data plate of the vehicle is first verified through visual inspection of the VIN data plate and vehicle title.

The New Method for Automated VIN Acquisition and Close Proximity VIN Verification provides both the automobile insurance industry and the consumer with a higher platform of protection that is easy to use and easy to access. This new method provides the industry with additional tools which can be used in deterring vehicle theft by providing real time data and offering an on scene approach to the early detection and recovery of stolen, missing, crashed or stranded vehicles. Therefore, providing both insurance companies and individuals with a practical, affordable and technologically advanced method which effectively eliminates the use of a repeater, call center, dispatch service and the time consuming "selected" vehicle apparatus activation as mentioned in the aforementioned prior art.

SUMMARY

The present invention offers a new method with a unique on scene real-time approach to acquiring and verifying VIN information anywhere within close proximity. This inventive method provides the insurance industry and individuals with an extra added layer of protection in the deterrence, detection and recovery of stolen, missing or crashed vehicles. This new method improves upon the art by providing an immediate and continuous acquisition of the 17 digit VIN which in turn, allows for the immediate on scene vehicle identification through VIN verification where the vehicle(s) year, make, model, color, owner and license plate information is received within a matter of seconds and within close proximity. This inventive method allows for the elimination of the repeater, call center and dispatch service.

This method provides for the use in acquiring VIN data and vehicle information from a vehicle(s) in a more safe, affordable, efficient and effective manner. This invention improves upon the art by providing consumers, auto insurance companies, law enforcement, automotive dealerships and heavy equipment owners with an affordable and additional method for deterring motor vehicle theft and heavy equipment theft. Also, improving upon the art by securing assets, protecting property and saving lives. The future of the present invention can be used as the catalyst for the replacement of the license plate reader (LPR) as well as the replacement of the license plate altogether because the vehicle license plate is only as good as the license plate itself. Known to those skilled in the art, stolen vehicles are often found with license plates from other non-stolen vehicles, which are from the same make and model of the stolen vehicle, therefore allowing the auto thief to go undetected, especially in those states that require two license plates per vehicle. This invention could also be used as a supplemental device to those states where only one attached rear license plate is displayed.

This New Method for Automated VIN Acquisition and Close Proximity VIN Verification is also ideal for determining vehicle ownership without reading the license plate number(s) of the vehicle(s). Unlike previous inventions known to the art, the New Method For Automated VIN Acquisition and Close Proximity VIN Verification provides law enforcement and consumers with a faster and safer means of obtaining real time vehicle information in the field. This can be accomplished without using a repeater which sends vehicle information through a call center or dispatch service and therefore diminishing the need for additional manpower. Detecting stolen vehicles through VIN recognition and the use of vehicle ownership verification methods can be accomplished without officers leaving the patrol vehicle which is safer. This new method can be used as an additional tool that will fill the gap between some of the existing technologies which are currently being used today in the recovery of stolen vehicles, but lack the up to date technological advances to thwart modern day vehicle theft.

DRAWINGS

Figure 1:
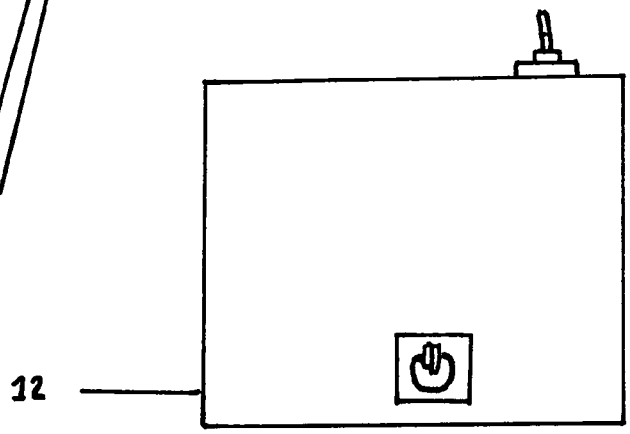

FIG. 1 is an illustration of the mobile WiFi (wireless fidelity) modem/router 12 comprised of conventional circuitry, and is pre-programmed with a 17 digit (VIN) Vehicle Identification Number of vehicle 13.

Figure 2:
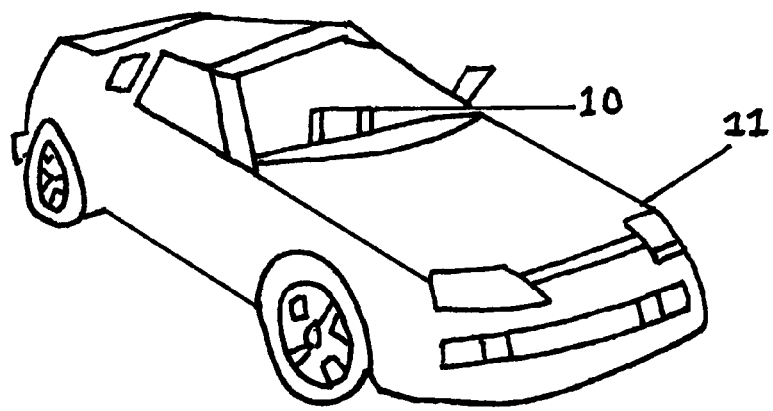
Figure 3:
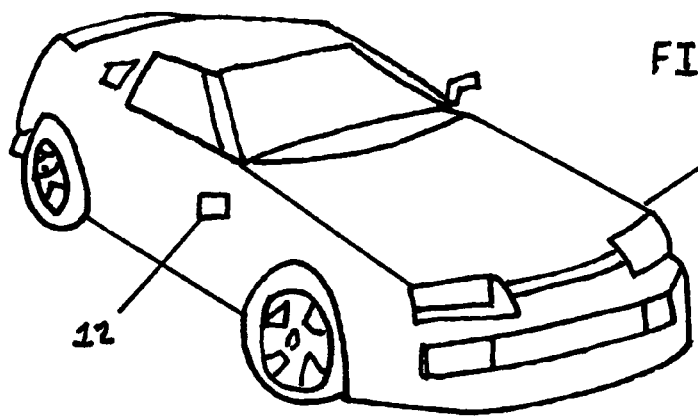

FIG. 2 is an illustration of vehicle 11 containing the mobile WiFi (wireless fidelity) equipped modem, laptop 10 comprised of conventional circuitry and positioned within vehicle 11, and is positioned within an approximate 0-50 radius of vehicle 13 which contains the mobile WiFi (wireless fidelity) equipped modem router 12 as shown in FIG. 3.

FIG. 3 is an illustration of vehicle 13 comprised of conventional circuitry, and the mobile WiFi (wireless fidelity) equipped modem/router 12 comprised of conventional circuitry and contained within said vehicle 13.

FIG. 4 is an illustration of the modem laptop comprised of conventional wiring and circuitry, and is seen depicted within said vehicle 11.

REFERENCE NUMERALS 10 modem, laptop with conventional wiring and circuitry.
11 vehicle with conventional wiring, containing laptop modem 10 with conventional wiring and circuitry.
12 WiFi (wireless fidelity) mobile modem/router with conventional wiring and circuitry.
13 vehicle with conventional wiring, containing WiFi (wireless fidelity) mobile modem/router 12 with conventional wiring and circuitry.

DETAILED DESCRIPTION

The detailed description of the present invention describes the illustration of FIG. 1 as it is used in the acquisition and verification of vehicle identification number(s) (VIN's) and is used to identify stolen, stranded and crashed vehicles 13 within close proximity. FIG. 1 illustrates the use of a mobile WiFi modem/router 12 which is preprogrammed by changing the Service Set Identifier SSID to a 17 digit (VIN) vehicle 13 identification number. Vehicle 13 is equipped with a mobile WiFi modem/router 12 by using the vehicles 13 existing conventional twelve volt electrical wiring system and is also equipped with a self contained battery backup, should the vehicles main electrical power be severed. The Mobile WiFi modem/router 12 is hidden within vehicle 13.

Mobile WiFi modem/router 12 is capable of modulating the 17 digit (VIN) into a radio signal and then broadcasting the signal until it is received by the Modem Laptop 10 through the use of Port Forwarding (PF), Real-time Transport Protocol (RTP) on a (WPA) WiFi Protected Access, Local Area Network (LAN) network. The network currently used is operated on the 802.11, 802.11b and 802.11g modes, wireless networking system which transmits between 2.4 Ghz and 5 Ghz. In turn, the data is transmitted up to 54 megabits per second. This system and method can also be operated using a (WAN) Wide Area Network.

The aforementioned information regarding "Wireless Fidelity" networks, WPA's, LAN's and WAN's function(s) is well known to those in the art and is to be considered only as a guide to how the method and system functions or operates and is not to be construed as re-inventing each component used in the inventive method. Modem laptop 10 as described in FIG. 2 is not limited to a laptop, personal computer, but applies to any computer modem or device which contains WiFi (Wireless Fidelity) capabilities. When vehicle 13 containing mobile WiFi modem/router 12 enters the approximate 50' zone of automated (VIN) acquisition, the Modem Laptop 10 contained in vehicle 11, then demodulates the radio signal (SSID) Service Set Identifier into the 17 digit (VIN) which was already preprogrammed into the mobile WiFi modem/router 12.

Modem Laptop 10 contained within vehicle 11 receives the 17 digit (VIN) which is within "close proximity" of vehicle 13 and is typically received within approximately 50 feet of the Mobile WiFi modem/router 12 hidden within vehicle 13. Within seconds, the 17 digit (VIN) will appear on the modem laptop 10 through the network name, Service Set Identifier (SSID). The 17 digit (VIN) transmitted from the mobile WiFi modem/router 12 is password protected against the potential for "spoofing" the (YIN) vehicle identification number.

Vehicle 13 equipped with mobile WiFi modem/router 12 moves outside the approximate 50' radius through any means other than the owner of vehicle 11, the 17 digit (VIN) will disappear from Modem Laptop 10. In turn, the officer within vehicle 11 or the vehicle 13 owner who is in possession of modem laptop 10 is alerted in real time as to the movement of vehicle 13 when it moves outside the approximate 50' radius of said vehicle 11 containing mobile WiFi modem/router 12.

The aforementioned illustrations are used as a guide and are not intended to be all inclusive. The manner in which the exact particulars of the method as described are therefore not mentioned for the purpose of limiting the scope of same. Various changes or modifications to the method described may be required to explain specific details to those skilled in the art and should not be construed as limiting the scope of the aforementioned claims numbered 1 through 3 and figures numbered 1 through 4.

Operation

The aforementioned mobile WiFi modem/router (12) used in this new system and method is known as the sending modem. The sending modem modulates the data, such as a 17 digit vehicle identification number (VIN) into a radio signal, however the modem holds up to approximately 37 characters. The receiving laptop modem (10) used in this system and method is described as a laptop, personal computer, handheld gaming system, PDA or cellular telephone equipped with a WiFi (Wireless Fidelity) signal or computer application.

The described modem devices can then be used by first responders or individuals to receive then demodulate the transmitted radio signal into a 17 digit vehicle identification number (VIN). This is achieved without connecting directly to an (ISP) Internet Service Provider or the use of (PPP) Point to Point Protocol. However, the system does require the use of an (LAN) Local Area Network, a (WAN) Wide Area Network or both. The present system and method can also carryout it's basic function through the use of radio signals as previously described.

The Automated VIN Acquisition System, Mobile WiFi Modem (12) continuously sends the password protected 17 digit VIN directly from the Mobile WiFi Modem/Router which is hidden within the vehicle (13). The radio signal has an approximate range of 50 feet which is ideal for "close proximity" vehicle locating. The 17 digit YIN is then received within said radius, and is known to the system as "close proximity" reception of the sending radio signal on a laptop modem (10), PC, PDA or handheld gaming device equipped with receiving a WiFi Modem signal. In turn, the 17 digit VIN received is then cross checked at the scene visually and then through Miles NCIC and NICB data bases with regard to whether or not the vehicle is stolen or missing. Automated VIN information sent and received using the New Automated VIN Acquisition Method and VIN Verification System also contains the vehicles year, make, model, color, owner information and vehicle license plate number which is then transmitted within "close proximity" between the target vehicle (13) and the non-target vehicle (11).

What I claim is:

1. A method for automated VIN acquisition and close proximity VIN verification wherein each of one or more vehicles comprises a Wireless Fidelity (WiFi) Modem/Router and transmitting equipment, and wherein one or more vehicles further comprises a computer receiving modem and receiving equipment, whereby 17 digit VINs (Vehicle Identification Numbers) are received automatically, simultaneously, continuously and within close proximity to the receiving equipment by the receiving equipment, comprising the following steps:

a) transmitting said vehicle 17 digit VIN, make, model, year, color, license plate and owner information from within said WiFi equipped vehicles, b) transmitting an alphanumeric code comprising said 17 digit VIN modulated into a radio signal through said Mobile WiFi Modem/Router with user service set identifier (SSID), then demodulating said radio signal to return said radio signal to said alphanumeric code comprising said 17 digit vehicle identification number (VIN), c) transmitting a close proximity radio signal consisting of said vehicle 17 digit VIN, year, make, model, color, license plate number and owner information within a radius of approximately 0 to 50 feet, d) receiving said radio signal through said computer receiving modem equipment consisting of stationary or handheld mobile WiFi receiving equipment including at least one of personal computers, handheld/stationary gaming systems, and PDAs and wherein computer receiving modems receive said 17 digit VIN from within close proximity to the computer receiving modem, and e) receiving said close proximity transmission of said radio signal consisting of said vehicle 17 digit VIN, year, make, model, color, license plate number and owner information within said radius of approximately 0 to 50 feet, f) transmitting said VIN and said vehicle information of said radio signal using said (WiFi) wireless fidelity equipment, and receiving said VIN of said radio signal using downloaded applications and platform definitions on laptops, PDAs, PCs and gaming systems on the 802.11a, b and g networks, and g) said radio signal consisting of said vehicle 17 digit VIN, year, make, model, color and license plate information received from said mobile WiFi modem/router is converted to said 17 digit VIN and said vehicle information within said radius of within approximately 0 to 50 feet, h) said VIN and vehicle information is received via said Mobile WiFi Modem/Router then compared to information visually acquired at the scene of traffic accidents and vehicle to vehicle crashes, to assist motorists and sick or injured persons within said WiFi Modem equipped vehicles, i) transmitting by said WiFi modem equipped motor vehicles within approximately 0-50 feet of single and multiple vehicle crashes, j) transmitting said VIN between vehicles within approximately 0-12 inches of each other, k) receiving said VIN between vehicles within approximately 0-12 inches of each other, l) transmitting VIN from missing, crashed or otherwise distressed vehicles that are within close proximity of patrol areas, parking lots and wooded areas which are not visible from the traveled portion of a roadway or interstate, m) receiving VIN from missing, crashed or otherwise distressed vehicles that are within close proximity of patrol areas, parking lots and wooded areas which are not visible from the traveled portion of a roadway or interstate, n) transmitting said 17 digit VIN, downloaded using an application from said WiFi equipped devices, while traveling or stationary by said WiFi Modem/Router and laptop modem devices within said close proximity zone of approximately 0-50 feet using said computer based application and platform definition, o) receiving said 17 digit VIN, downloaded using an application from said WiFi equipped devices, while traveling or stationary by said WiFi Modem/Router and laptop modem devices within said close proximity zone of approximately 0-50 feet using said computer based application and platform definition, p) transmitting said 17 digit VIN, downloaded using an application from said WiFi equipped devices, while traveling or stationary as long as said WiFi Modem/Router and laptop modem devices are within said close proximity zone of approximately 0-50 feet using said computer based application and platform definition, q) transmitting of said 17 digit VIN from a WiFi Modem/Router equipped vehicle which is towed, driven or removed from said close proximity zone of within approximately 0-50 feet radius, wherein said 17 digit VIN information will no longer appear on the receiver or laptop modem and will therefore alert said vehicle owner, operator, security, dealership or equipment owner that said vehicle or equipment is no longer within said close proximity zone of approximately 0-50 feet using a computer based application and/or platform definition, r) receiving of said 17 digit VIN from said WiFi Modem/Router equipped vehicle which is towed, driven or removed from said close proximity zone of within approximately 0-50 feet radius, wherein said 17 digit VIN information will no longer appear on the receiver or laptop modem and will therefore alert said vehicle owner, operator, security, dealership or equipment owner that said vehicle or equipment is no longer within said close proximity zone of approximately 0-50 feet using a computer based application and/or platform definition.

2. Method as claimed in claim 1 wherein said 17 digit VIN vehicle identification number and said stolen, crashed or missing vehicle information is transmitted from said vehicle equipped with said wireless fidelity WiFi equipment and received by said vehicles equipped with said WiFi computer modem.

3. Method as claimed in claim 2 wherein the means for transmitting and receiving said stolen, crashed or missing vehicle 17 digit VIN through means of wireless fidelity WiFi comprises:

a) transmitting means of said vehicle 17 digit VIN from said stolen, crashed or missing vehicles, b) receiving means of said vehicle 17 digit VIN from said stolen, crashed or missing vehicles, c) recovering means of said vehicle 17 digit VIN from said vehicle to vehicle crashes.

* * * * *